(12) United States Patent
Prull

(10) Patent No.: US 6,363,654 B2
(45) Date of Patent: Apr. 2, 2002

(54) METHOD AND APPARATUS FOR THERMALLY KILLING WEEDS

(76) Inventor: Gregory G. Prull, 25560 Wheaton La., Veneta, OR (US) 97487

(*) Notice: Subject to any disclaimer, the term of this patent is extended or adjusted under 35 U.S.C. 154(b) by 0 days.

(21) Appl. No.: 09/733,371

(22) Filed: Dec. 8, 2000

Related U.S. Application Data

(63) Continuation-in-part of application No. 09/247,207, filed on Feb. 9, 1999, now abandoned.

(51) Int. Cl.$^7$ .............................................. A01M 15/00
(52) U.S. Cl. ....................................................... 47/1.44
(58) Field of Search ........................... 47/1.5, 48.5, 58; 111/7.2; 239/129–135; 126/271.1

(56) References Cited

U.S. PATENT DOCUMENTS

| | | |
|---|---|---|
| 5,020,510 A | 6/1991 | Jones |
| 5,189,832 A | 3/1993 | Hoek et al. |
| 5,366,154 A | 11/1994 | Thompson |
| 5,430,970 A | 7/1995 | Thompson |
| 5,433,758 A | 7/1995 | Thompson |
| 5,575,111 A | 11/1996 | Rajamannan |
| 5,946,851 A | 9/1999 | Adey et al. |

FOREIGN PATENT DOCUMENTS

| | | |
|---|---|---|
| JP | 404356149 A | 12/1992 |
| WO | WO 00/47043 | 8/2000 |

*Primary Examiner*—Peter M. Poon
*Assistant Examiner*—Francis T. Palo
(74) *Attorney, Agent, or Firm*—Robert E. Howard

(57) ABSTRACT

A method and apparatus for thermally killing weeds and other unwanted vegetation from areas where their presence is undesirable. The method and apparatus are especially useful for killing weeds located adjacent auto or rail roadways or airport runways. The method of killing weeds involves first spraying the weeds with an amount of water sufficient to cover a substantial portion of the exposed outer parts of the weeds, and then subjecting the water covered weeds to an elevated temperature sufficient for the time of exposure to kill them. The apparatus for thermally killing weeds by this method includes a water sprayer unit and a heater enclosure or box, the water sprayer unit being located in front of the heater box. The heater box has burners located at the forward end thereof that impact a heatable element capable of generating infra-red radiation. A porous apron extends between the bottom of the heater box and the ground to allow exhausting of combustion products and water vapor.

12 Claims, 2 Drawing Sheets

METHOD AND APPARATUS FOR THERMALLY KILLING WEEDS

CROSS-REFERENCE TO RELATED APPLICATIONS

This is a continuation-in-part of application Ser. No. 09/247,207 filed Feb. 9, 1999 Now abandoned.

BACKGROUND OF THE INVENTION

This invention relates to a method and an apparatus for thermally killing weeds.

The use of chemical herbicides to kill weeds has come under increasing attack as being environmentally unfriendly.

A number of alternative ways of killing weeds have been suggested.

Thermal killing of weeds has achieved some measure of success as an alternative to the use of herbicides. Some such devices burn propane or other gaseous or liquid hydrocarbons to produce flames or hot air aimed directly at the weeds. See, for example, the devices described in U.S. Pat. No. 5,020,510 and 5,189,832. One of the problems associated with this approach is setting fire to the weeds, which generates air pollution and, possibly, wild fires.

It has also been suggested to use hot foams to kill weeds. See, for example, U.S. Pat. No. 5,575,111.

It has been further suggested to spray hot water on weeds followed by compressing the sprayed weeds or applying a foam blanket to the sprayed weeds, the purpose of both approaches being to hold the hot water against the plants for an extended period of time. See, for example, U.S. Pat. Nos. 5,430,970 and 5,433,758.

It is an object of this invention to provide a method and apparatus for thermally killing weeds that is effective, economical, and minimizes the potential for inadvertently causing fires.

SUMMARY OF THE INVENTION

The invention is a method and apparatus for thermally killing weeds, grasses, or other unwanted vegetation adjacent auto or rail roadways, airport runways, or any area where it is desired to remove such unwanted vegetation.

The method of this invention for thermally killing weeds involves first applying water at ambient temperature onto the weeds targeted to be eliminated and subsequently heating the water and the weeds to a temperature sufficient to cause bursting of cell walls and denaturing of plant proteins which results in the death of the exposed tops of the weeds.

The apparatus for thermally killing weeds comprises a water spray unit and an associated heater enclosure or box located in trailing relationship to the heater. The heater box has a top or roof, side walls, and end walls. The bottom of the heater box is open to the atmosphere. The heater box has an infrared heat generating element located on the underside of the roof. The infrared heat generating element may be corrugated or otherwise shaped to provide maximum exposure of the weeds to infrared heating. The open bottom of the heater box is, in operation, located close to ground level, and has a porous apron extending from the bottom of the heater box into contact with the ground.

DESCRIPTION OF PREFERRED EMBODIMENTS

The thermal weed killer apparatus 10 of the invention is mobile and can be moved over the ground in an area where it is desired to kill unwanted vegetation. Such movement can be effected in a number of ways. A preferred way is to pivotally attach apparatus 10 to one end of a boom 12, the other end of boom 12 being connected to a motorized vehicle (not shown). Other means of attachment to a motorized vehicle can be used. Also, apparatus 10 could be configured for either manual or self-contained motorized movement, or towing behind a motorized vehicle.

Figure 1:
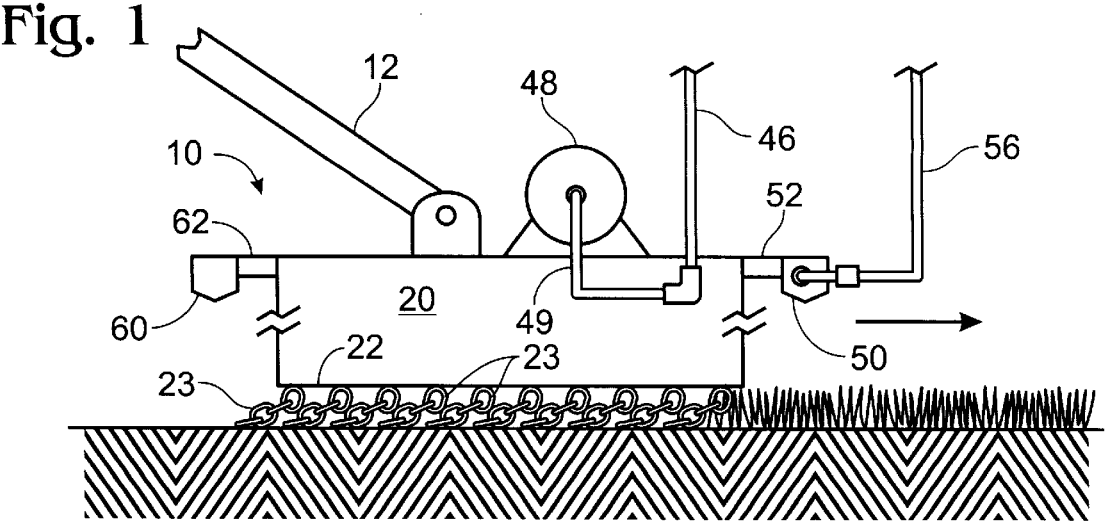
FIG. 1 is a side view of a first embodiment of the apparatus of the present invention.

A metal heater enclosure or box 20 has an open bottom 22 which, in operation, is located closely adjacent the ground, as seen in FIG. 1. A plurality of chains 23 extend between the bottom 22 of heater box 20 and the ground to provide a porous apron. Other flexible means providing such a porous apron may be used instead of chains.

Heater box 20 is comprised of a metal top 24, a pair of parallel metal side walls 26 and a pair of parallel metal end walls 28. A layer of insulation 30 is located between top 24 and infrared element 32 located below and parallel to top 24.

Infrared element 32 is made of metal or other heat absorbing material capable of generating infrared radiation when heated, and is preferably corrugated with a plurality of ridges 34 extending downwardly and parallel to end walls 28, as shown.

A heater manifold enclosure 40 extends between side walls 26 closely adjacent the front end wall 28. Located inside manifold enclosure 40 is a U-shaped manifold pipe 42 communicating with a plurality of burners 44 extending outwardly from manifold pipe 42 and manifold enclosure 40 toward rear end wall 28. Manifold pipe 42 communicates with a flexible or rigid conduit 46 via union 47, and conduit 46 communicates manifold pipe 42 with a supply tank of flammable fuel (not shown), such as propane. Such a propane tank may be mounted on the heater box 20 of apparatus 10, but it can be carried by the motorized vehicle to which apparatus 10 is attached or in a separate trailer.

In order to accomplish efficient combustion, it is important that the liquid fuel be preheated sufficiently to vaporize it prior to combustion. Such preheating can be accomplished in a number of ways. One way is to configure manifold pipe 42 in a U-shape, as illustrated. Such a U-shape configuration heats up the liquid fuel entering manifold pipe 42 by having the initial leg thereof being in close proximity to the final leg thereof, the final leg being heated by burners 44.

Although manifold pipe 42 is illustrated as being U-shaped to effect preheating of the liquid fuel, manifold pipe 42 may be straight or have other shapes with preheating being accomplished in other ways, such as by passing conduit 46 through the space between infrared element 32 and the top 24 of heater box 20, or having a separate heater for preheating the liquid fuel.

An air blower 48 supplies air via rigid or flexible conduit 49 to the fuel entering manifold pipe 42 at an appropriate location, such as at union 47.

A water sprayer unit 50 is attached to the front end wall 28 of heater box 20 by a plurality of support arms 52. Sprayer unit 50 has a plurality of holes and/or nozzles 54 located thereon. A flexible or rigid conduit 56 communicates sprayer unit 50 with a tank of water (not shown), which can be mounted on the heater box 20 of apparatus 10, but it can also be carried by the motorized vehicle to which apparatus 10 is attached.

The water supplied to sprayer 50 is preferably maintained at ambient temperature to reduce costs and the complexity of the thermal weed killer apparatus, but the water may be preheated to facilitate operation of apparatus 10 at a higher rate of speed by thereby requiring less residence time of heater box 20 over the wetted weeds.

Although the water sprayer unit 50 is preferably attached to heater box 20 of apparatus 10, it could be mounted on the vehicle to which apparatus 10 is attached or could be attached to a separate vehicle.

It is desirable to locate a secondary spray system on the apparatus to allow any weed fires that might be started to be extinguished. To this end, secondary water spray unit 60 may be attached to heater box 20 by means of a plurality of support arms 62. A rigid or flexible water supply conduit 64 communicates with the water supply tank of apparatus 10.

Figure 2:
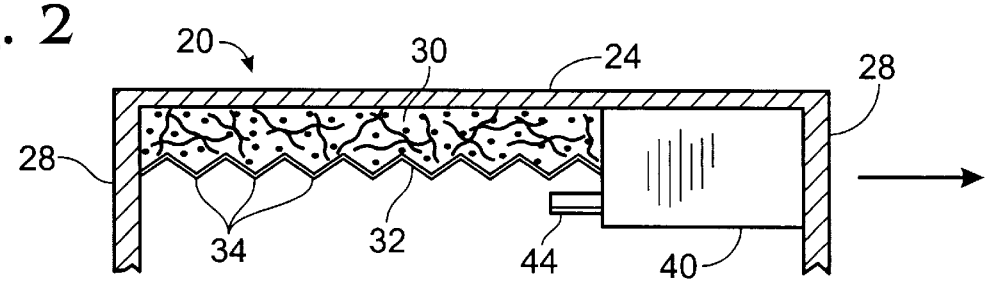
FIG. 2 is a partial side view, in section, of the heater box of the first embodiment of the apparatus of the present invention.
Figure 3:
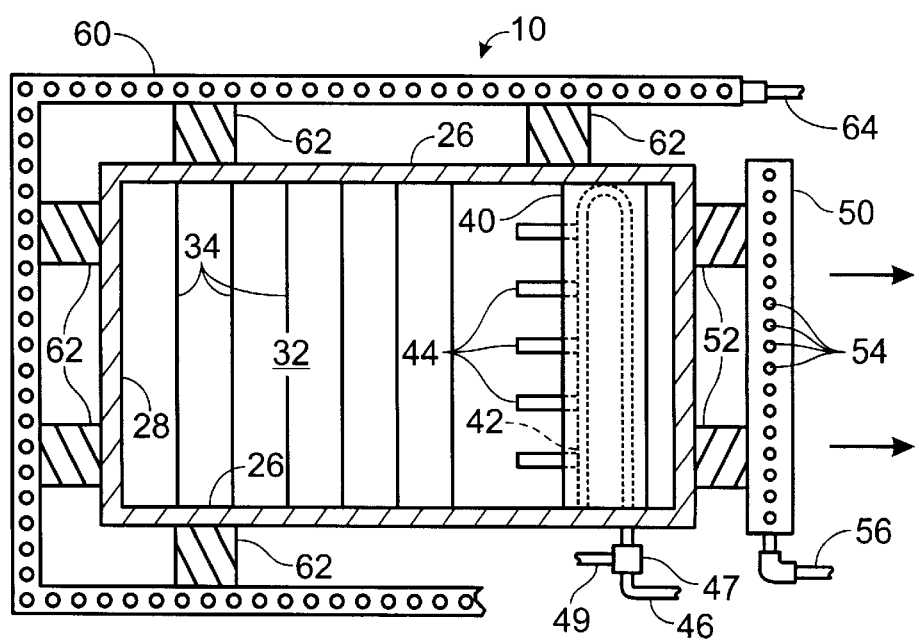
FIG. 3 is a bottom view of the first embodiment of the apparatus of the present invention.

In operation, apparatus 10 is moved, via boom arm 12 mounted on a motorized vehicle, over a highway shoulder, railroad ballast area, or other area where it is desired to kill weeds. Apparatus 10 is moved in the direction indicated by the arrows in FIGS. 1–3.

Water is fed to sprayer 50 and exits holes/nozzles 54 to douse weeds passing beneath sprayer 50.

Propane or other flammable fuel is fed from a supply tank to manifold pipe 42 via conduit 46. Air is supplied from blower 48 via conduit 49. The fuel and air mixture is lit as it exits burners 44. The heat generated by burners 44 heats infrared element 32 to produce infra-red radiation within heater box 20, which is directed downwardly through open bottom 22 and onto the moisturized weeds passing beneath heater box 20. The water on the weeds enhances conduction of heat to the plant's exposed surfaces and helps retain heat to thereby lengthen the time of exposure of the weeds to elevated temperatures. The temperature generated by heater 20 is sufficient to vaporize at least some of the sprayed-on water from the weeds. The sprayed-on water significantly assists in subjecting the weeds to a killing temperature.

Although infrared radiation generated by infrared heating element 32 is the primary source of heat applied to the target weeds, there is some direct contact of taller weeds with the flames issuing from burners 44. In addition, some turbulent hot air is generated by the burners 44 which can also contact target weeds and assist in vaporizing water from the leaf surfaces of these previously sprayed weeds.

Apparatus 10 is moved over the weeds at a speed to vaporize all or substantially all of the thin film of water coating the weeds but not to such conditions as would cause the weeds to combust. However, if the apparatus is being operated in weather or other conditions where it is difficult to prevent the weeds from catching on fire, secondary sprayer unit 60 may be operated to prevent such fires.

The porous apron formed by chains 23 or other porous curtain material allows water vapor and combustion products to escape to the atmosphere. The mechanical action of the porous apron also helps extinguish any flames should they occur.

Figure 4:
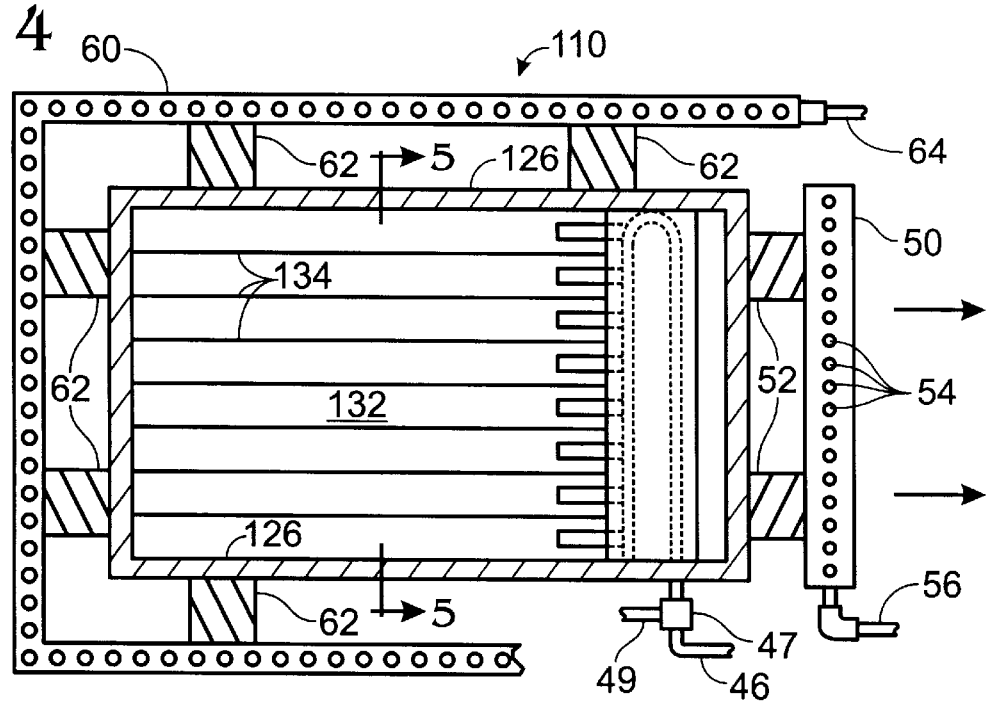
FIG. 4 is a bottom view of the second embodiment of the apparatus of the present invention.
Figure 5:
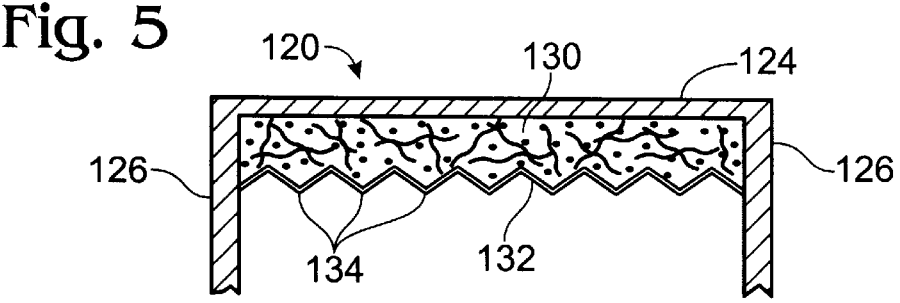
FIG. 5 is a lateral cross-sectional view taken along line 5—5 of FIG. 4 of the heater box of the second embodiment of the apparatus of the present invention.
Figure 6:
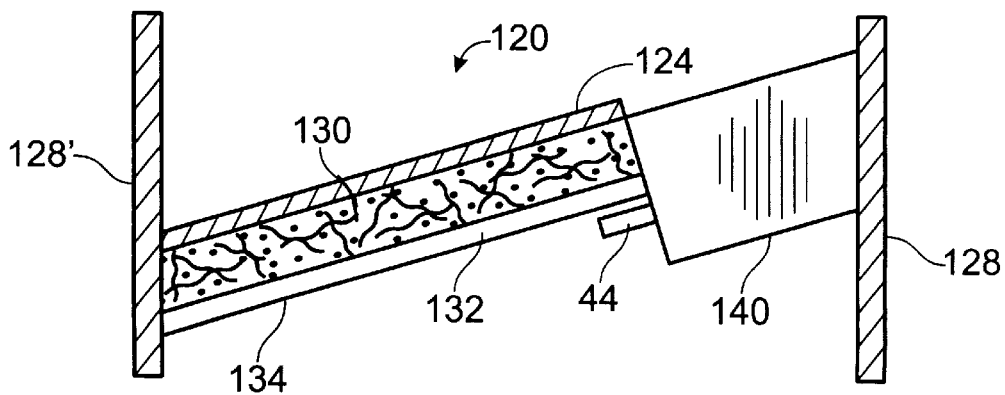
FIG. 6 is a longitudinal cross-sectional view of the heater box of the second embodiment of the apparatus of the present invention.

A second embodiment of the heater enclosure or box is shown in FIGS. 4–6. Parts common to the weed killer apparatus 10 of the invention described above relative to the first embodiment have the same reference number. Parts of the second embodiment that are similar in function to those parts of the first embodiment have the same reference number but increased by 100.

Heater enclosure or box 120 is open at the bottom and includes a sloping metal top 124, a pair of parallel metal side walls 126, a front metal end wall 128 and a parallel rear metal end wall 128'. The metal top 124 of heater box 120 slopes downwardly from adjacent the front (leading) end wall 128 to the rear (trailing) end wall 128' thereof. The slope of metal top 124 relative to the ground may vary from one degree to about 45 degrees.

A layer of insulation 130 is located between top 124 and infrared element 132 located therebelow. The major plane of infrared heating element 132 is substantially parallel to the major plane of metal top 124. Infrared heating element 132 is made of metal or other heat absorbing material capable of generating infrared radiation when heated, and is preferably corrugated with a plurality of ridges 134 extending downwardly, and parallel to the longitudinal side walls 126, as shown.

The upper surface of infrared heating element 132 is in contact with the lower surface of insulation layer 130. The lower surface of infrared heating element 132 faces toward the open bottom of heater box 120.

A heater manifold enclosure 140 extends between side walls 126 adjacent the front end wall 128. Located inside manifold enclosure 40 is a U-shaped manifold pipe 42 communicating with a plurality of burners 44 extending outwardly from manifold pipe 42 and manifold enclosure 140 toward rear end wall 128', burners 44 being located between and beneath the ridges 134 of infrared element 132, as shown. Manifold pipe 42 communicates with a flexible or rigid conduit 46 via union 47, and conduit 46 communicates manifold pipe 42 with a supply tank of flammable fuel (not shown), such as propane. Such a propane tank may be mounted on the heater box 120 of apparatus 110, but it can be carried by the motorized vehicle to which apparatus 110 is attached or in a separate trailer.

In operation of the second embodiment just discussed, thermal weed killer 110 is mounted for movement across the ground in the same manner as for apparatus 10, as illustrated in FIG. 1. Flames from the outlets of propane burners 44 move across the underside of the angled infrared heating element 132 toward the ground located adjacent the bottom of rear end wall 128'. Such flames contact and impact the target weeds located adjacent rear end wall 128' with direct flames, thus increasing the treatment effects of the thermal weed killer 10. In addition, the velocity of air supplied from blower 48 can be adjusted to create turbulent hot air under the angled infrared heating element 132 which moves downwardly across the angled underside of heating element 132 toward the ground located adjacent the bottom of rear end wall 128' where it contacts target weeds, moving them about. This movement helps maximize contact between the target weeds and the hot air, the infrared energy from heating element 132, and the direct flames from the burners 44. Together, the impact of these three thermal factors enhances the vaporization of water from the leaf surfaces of the previously sprayed weeds thereby maximizing the thermal weed killing effect.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method for killing weeds comprising first spraying the weeds with water, and next, non-simultaneously with said spraying, subjecting the wet weeds to an elevated temperature from a source of infrared radiation for a period of time sufficient to kill at least the exposed portions of said weeds.

2. The method of claim 1 wherein said water sprayed onto said weeds is at ambient temperature.

3. The method of claim 1 wherein said water sprayed onto said weeds is at a temperature above ambient temperature.

4. An apparatus for thermally killing weeds comprising:
   a heater enclosure having means for generating infrared radiation, said enclosure having at least one opening in the bottom thereof for communicating said infrared radiation with said weeds; and
   spray means for spraying water onto said weeds, said sprayer means being located forward of said heater enclosure a distance adapted to provide that in operation said weeds are first subjected to said water from said spray means, and next, non-simultaneously with said spraying, subjected to said infrared radiation from said heater enclosure.

5. The apparatus of claim 4 wherein said means for generating infrared radiation includes at least one heat absorbing element capable of generating infrared radiation upon heating, and heating means for heating said element.

6. The apparatus of claim 5 wherein said heating means is comprised of at least one burner adapted to combust liquid fuel to produce a flame and to direct said flame into contact with said heat absorbing element.

7. The apparatus of claim 6 wherein said heating means includes means for preheating the liquid fuel prior to combustion in said burner.

8. The apparatus of claim 6 including means for supplying air to the liquid fuel prior to combustion in said burner.

9. An apparatus for thermally killing weeds comprising:
   a heater enclosure having a top, a pair of substantially parallel side walls and a first end wall extending between said side walls adjacent the front of said enclosure and a second end wall extending between said side walls adjacent the rear of said enclosure, said end walls being substantially parallel to each other, the bottom of said enclosure being open;
   a layer of insulation adjacent the top of said heater enclosure;
   an infrared heating element having an upper surface in contact with said layer of insulation at the top of said heater enclosure and a lower surface facing the open bottom of said enclosure;
   a heater manifold extending between said side walls and closely adjacent said first end wall, a manifold pipe located within said heater manifold, said manifold pipe having a first end communicating with a source of flammable fuel, said manifold pipe communicating with a plurality of burners along at least a portion of its length, said burners having an outlet communicating with the interior of said heater enclosure and adapted to direct their flames into contact with said lower surface of said infrared heating element; and
   a sprayer means for spraying water, said sprayer means being located forward of said first end wall.

10. The apparatus of claim 9 wherein said infrared heating element is comprised of corrugated metal having a plurality of ridges extending downwardly toward the bottom of said enclosure.

11. The apparatus of claim 10 wherein said ridges are substantially parallel to said end walls.

12. The apparatus of claim 10 wherein said ridges are substantially parallel to said side walls.

* * * * *